US010946593B2

(12) United States Patent
Johnson et al.

(10) Patent No.: US 10,946,593 B2
(45) Date of Patent: *Mar. 16, 2021

(54) HEATER SYSTEM FOR FIBER PLACEMENT MACHINE

(71) Applicant: The Boeing Company, Chicago, IL (US)

(72) Inventors: Brice A. Johnson, Federal Way, WA (US); Samuel F. Pedigo, Lake Forest Park, WA (US); Sayata Ghose, Sammamish, WA (US); John Z. Lin, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/696,041

(22) Filed: Nov. 26, 2019

(65) Prior Publication Data

US 2020/0094494 A1 Mar. 26, 2020

Related U.S. Application Data

(63) Continuation of application No. 15/689,703, filed on Aug. 29, 2017, now Pat. No. 10,525,638.

(51) Int. Cl.
*B29C 70/38* (2006.01)
*B29C 35/08* (2006.01)
*B29C 35/02* (2006.01)

(52) U.S. Cl.
CPC ........ *B29C 70/384* (2013.01); *B29C 35/0288* (2013.01); *B29C 35/0805* (2013.01); *B29C 2035/0822* (2013.01)

(58) Field of Classification Search
CPC ............ B29C 35/0288; B29C 35/0805; B29C 2035/0822; B29C 70/38; B29C 70/382; B29C 70/384
See application file for complete search history.

(56) References Cited

U.S. PATENT DOCUMENTS 5,447,586 A * 9/1995 Tam ................... B29C 53/8041
156/64
6,451,152 B1 * 9/2002 Holmes ................ B23K 26/034
156/173

(Continued)

FOREIGN PATENT DOCUMENTS

EP           3202547 A1    8/2017
WO   WO-2017006099 A1 *  1/2017 ......... B29C 35/0227

OTHER PUBLICATIONS

Extended European Search Report dated Oct. 7, 2020 in European Patent Application No. 20176866.0.

*Primary Examiner* — George R Koch
(74) *Attorney, Agent, or Firm* — Ostrager Chong Flaherty & Broitman P.C.

(57) ABSTRACT

Closed-loop systems and methods for controlling the temperature at the compaction point as an automated fiber placement (AFP) machine is placing material over complex surface features at varying speeds. The closed-loop system starts with multiple infrared temperature sensors directed at the layup surface in front of the compaction roller and also at the new layup surface behind the compaction roller. These sensors supply direct temperature readings to a control computer, which also receives speed data and a listing of active tows from the AFP machine and is also programmed with the number of plies in the current layup. In accordance with one embodiment, the heater control system uses a proportional-integral-derivative loop to control the temperature at the compaction point (e.g., at the interface of the compaction roller and a newly laid tow) and regulate the heater power to achieve the desired temperature.

21 Claims, 11 Drawing Sheets

(56) References Cited

U.S. PATENT DOCUMENTS

| | | |
|---|---|---|
| 7,731,816 B2 | 6/2010 | Oldani et al. |
| 10,525,638 B2 * | 1/2020 | Johnson ................ B29C 70/384 |
| 2003/0102070 A1 * | 6/2003 | Black .................. B29C 35/0288 |
| | | 156/64 |
| 2007/0187021 A1 * | 8/2007 | Oldani ................ B29C 35/0288 |
| | | 156/166 |
| 2018/0194040 A1 * | 7/2018 | Barnes .................... B29C 70/38 |

\* cited by examiner ly placed on the tool). The substrate will build up to include a plurality of layers of prepreg material on that tool surface as the lamination process proceeds. Automated fiber placement (AFP) machines use heaters, such as infrared heaters in front of the compaction roller to heat the substrate in order to enhance material tack prior to laminating a new ply over the substrate. Infrared heating provides substantial benefits in safety and ease of implementation over laser heating sources, and produces a more robust and effective means of heating compared to hot gas impingement that was first used in the industry. The heat is needed to cause the material to adhere to the surface during the layup of thermoset composites. An infrared heating system should heat the substrate sufficiently to establish good tack without overheating.

HEATER SYSTEM FOR FIBER PLACEMENT MACHINE

RELATED PATENT APPLICATION

This application is a continuation of and claims priority from U.S. patent application Ser. No. 15/689,703 filed on Aug. 29, 2017, now U.S. Pat. No. 10,525,638 B2.

STATEMENT REGARDING FEDERALLY SPONSORED RESEARCH OR DEVELOPMENT

This invention was made with Government support under contract number NNL09AA00A-2A38 awarded by NASA. The Government has certain rights in this invention.

BACKGROUND

This disclosure generally relates to automated fiber placement (AFP) machines that rely on calibrated heaters to control power output. In particular, this disclosure relates to systems and methods for controlling the heater output during placement of tows of fiber-reinforced plastic material.

Fiber-reinforced composite materials comprise fibers embedded in a matrix material, such as thermoset and thermoplastic polymer resins. The fibers carry loads and provide strength and stiffness. A composite material has high strength and stiffness in the direction of the fiber, and lower strength and stiffness in a direction perpendicular to the fiber.

A variety of machines exist that can deposit materials made of reinforcement fibers pre-impregnated with thermosetting or thermoplastic resin (also known as "prepreg composite material"). Advanced fiber placement (also known as "tow placement technology") is a fully automated process for the production of composite laminates from a plurality of narrow prepreg tapes, or "tows", that combines the differential payout capability of filament winding and the compaction and cut-restart capabilities of automated tape laying. Carbon fibers pre-impregnated with thermoset resin are most commonly used in the aerospace industry and therefore the fiber placement process will be described herein assuming a thermoset material system.

Most fiber placement systems have seven axes of motion and are computer controlled. The axes of motion, i.e., three position axes, three rotation axes and an axis to rotate the work mandrel, provide the fiber placement machine flexibility to position the fiber placement head onto the part surface, enabling the production of complicated composite parts. During the fiber placement process, tows of slit prepreg tape are placed on the surface in bands of parallel fibers, called courses (i.e., each course consists of multiple parallel tows). The AFP head lays down successive courses to form the multiplicity of layers or plies making up the final composite laminate.

The major process parameter for controlling the tack and adhesive properties of the prepreg system during fiber placement is substrate temperature (that is, the temperature of the prepreg material already placed on the tool). The substrate will build up to include a plurality of layers of prepreg material on that tool surface as the lamination process proceeds. Automated fiber placement (AFP) machines use heaters, such as infrared heaters in front of the compaction roller to heat the substrate in order to enhance material tack prior to laminating a new ply over the substrate. Infrared heating provides substantial benefits in safety and ease of implementation over laser heating sources, and One method of heater control uses a calibrated curve of heater power as a function of machine laydown velocity. Typically, during machine installation, a heater characterization test is run to measure the response of the substrate temperature to various power settings. After sweeping through a range of processing conditions, a response table is established that defines the commanded heater power output as a function of machine velocity. The settings are then defined in the machine operations documentation, such as process control documents, prior to use in production. This is a first-order, open-loop solution that cannot take into account all of the relevant variables that affect the actual material temperature, such as number of plies under the substrate, the tool material, the emissivity of the substrate, heat buildup in the laminate during continuous processing, heat buildup in the heater assembly and compaction roller during continuous processing, ambient conditions, and dynamic set points as a function of velocity, among others. Additionally, the existing methods of calibrating the heaters tailor the process for the peak temperature of the material which occurs before the compaction roller. The material then cools a certain amount before compaction, resulting in an incorrect understanding of material temperature at the compaction point (that is, the location where the incoming new ply contacts the substrate).

The industry typically employs open-loop controls for infrared heaters due to simplicity and the expediency in qualification of machines for production. The lamp used to heat the substrate during AFP currently employs an open-loop control method based entirely on a single heat setting from the operator and the speed of the head. This limits the ability to control heating of complex geometry parts.

SUMMARY

The subject matter disclosed in some detail below is directed to systems and methods for controlling heater output during automated tow placement based on a combination of sensor feedback, process models, numerical control (NC) programming data, ambient conditions, and material models to determine the optimal power output of the heater. More specifically, this disclosure is directed to closed-loop systems and methods for controlling the temperature at the compaction point (a.k.a. "nip point") to prevent over- and under-heating as an AFP machine is placing tows of fiber-reinforced plastic material over complex surface features at varying speeds. These systems and methods provide active control of material temperature under the compaction roller during the fiber placement process, accounting for variability encountered during processing. The primary variable that controls part quality for fiber placement is the material temperature during compaction. The systems disclosed herein control this primary parameter using a closed loop such that optimal processing conditions can be maintained during the fabrication of composite structures in order to provide the best quality at the highest laydown rates possible.

A closed-loop heater control system offers an improvement over a typical open-loop method. The temperature of the layup (i.e., substrate) is measured in real-time by one or more temperature sensors. The heater control system can achieve the desired temperature in spite of process variability. The room temperature, initial layup temperature and tooling temperature can all be sources of process variation for which the closed-loop system may compensate. Closed-loop control of the heater allows for control over the manufacturing process as the geometry of AFP parts increases in complexity and capacity. The variables that affect actual substrate temperature include tooling material, number of plies on the surface, substrate temperature, compaction roller material, compaction roller temperature, laydown rate, infrared heater lag, heater housing temperature, compaction level of the substrate, and distance of the heater to the surface due to contour variations. The closed-loop system can be built around the most fundamental variables. Sensor feedback can be integrated to drive the proper substrate temperature for the ideal lamination process.

More specifically, the embodiments of a closed-loop heater control system disclosed herein incorporate inputs from one or more temperature sensors (e.g., pyrometers), machine speeds and position, thermal models, and NC program inputs to maintain the optimal processing conditions for the placement of fiber-reinforced plastic materials, such as thermoset prepreg materials. The system processes the inputs in real-time and outputs the heater power needed to reach the optimal material temperature at the compaction point. The substrate temperature under the heater can also be determined. This information can be used to prevent the material from exceeding maximum allowable temperatures in addition to controlling the temperature at the compaction point.

The closed-loop systems disclosed herein use pyrometers to control the compaction point temperature in real-time as a new tow or plurality of tows is being placed. In accordance with one embodiment, thermal models of the layup, tooling, compaction roller and heater were developed. These are dynamic models incorporating substrate temperature, layup speed and distance of the heater to the substrate. In addition, the number of plies in the current layup will be included to account for variations in thermal flow. Thermal modeling is used to estimate the temperature at the compaction point and then adjust heater output. Desired heater output will be a result of proportional-integral-derivative (PID) control, or other known control strategy, and may be driven by geometry, layup speed, and material.

More specifically, the closed-loop heater control system disclosed in some detail below comprises a control computer that uses a two-dimensional (2-D) thermal model that can correlate temperature measurements from one or more temperature sensors to the actual compaction point temperature. That compaction point temperature is used as the control point. The thermal model takes into account variables such as substrate temperature, number of plies, tool material, feed rate, distance separating the heater and the substrate, and heater power. To construct the thermal model, correlation curves were generated to relate compaction temperature to the temperature sensor measurements. These correlations are used in real-time in the control loop to control substrate temperature at the compaction point. Significant cooling can occur from the point where the sensor measures substrate temperature to where the material is compacted. For advanced AFP processes, knowing the actual compaction point temperature is important to maximize part quality and process capabilities.

In accordance with some embodiments, multiple infrared temperature sensors (hereinafter "IR temperature sensors") are directed at the layup surface in front of the compaction roller and also at the new layup surface behind (i.e., aft of) the compaction roller. In accordance with alternative embodiments, only one or more IR temperature sensors directed at the layup surface in front of the compaction roller are used or only one or more IR temperature sensors directed at the layup surface behind (i.e., aft of) the compaction roller are used.

As used herein, the term "IR temperature sensor" means an optical-electronic sensor that converts impinging infrared radiation into a temperature measurement. Such an IR temperature sensor has the ability to measure temperature without touching an object. These sensors supply direct temperature readings to a control computer that controls the power supplied to an infrared heater. The IR temperature sensors should be mounted and shielded in such a way to prevent photons from the infrared heater from being reflected directly into the sensors.

In addition, data from robot and NC programs are integrated into the control process. The control computer is communicatively coupled to a robot controller so that it may receive data from the robot. The control computer and robot controller are programmed to pass data and calculate a final heater power output. This output is sent to a heater power controller for real-time modulation of heater power. The thermal modeling uses the layup speed as an input variable. This will be supplied by the robot controller continuously throughout the layup. In addition, the part and head geometries influence which, if any, sensors are pointed at the part. This data will be sent from the robot controller to the control computer. The control computer will use this information to disable sensors that are not over the part surface. The control computer also receives a listing of active tows being placed from the robot controller and is programmed with the number of plies in the current layup. In accordance with one embodiment, the control computer is configured to execute a PID loop to control the temperature at the compaction point (e.g., at the interface of the compaction roller and a newly laid tow) and regulate the heater power to achieve the desired compaction point temperature.

Although various embodiments of systems and methods for controlling the temperature at the compaction point in an AFP machine will be described in some detail below, one or more of those embodiments may be characterized by one or more of the following aspects.

One aspect of the subject matter disclosed in detail below is an automated fiber placement machine comprising: a head comprising a compaction roller; a heater mounted forward of the compaction roller; a first temperature sensor directed at a first measurement spot located either forward of the compaction roller and aft of the heater or aft of the compaction roller, wherein the first temperature sensor, when operative, outputs first temperature data representing an amount of radiation transduced into electrical signals by the first temperature sensor when the compaction roller is in contact with a substrate; a non-transitory tangible computer-readable storage medium storing computer code representing a thermal model that is configured to infer an estimated compaction point temperature of the substrate under the compaction roller based at least in part on temperature data output by one or more temperature sensors; and a computing system configured to perform the following operations: using the thermal model to calculate an amount of electrical power to be supplied to the heater as a function of at least the first temperature data output by the first temperature sensor; and outputting heater power control signals representing the amount of electrical power to be supplied to the heater. The automated fiber placement machine may further comprise a second temperature sensor directed at a second measurement spot located either forward of the compaction roller and aft of the heater if the first measurement spot is located aft of the compaction roller or aft of the compaction roller if the first measurement spot is located forward of the compaction roller and aft of the heater, wherein the second temperature sensor, when operative, outputs second temperature data representing an amount of radiation transduced into electrical signals by the second temperature sensor when the compaction roller is in contact with the substrate, wherein the thermal model is configured to infer the estimated compaction point temperature of the substrate under the compaction roller based at least in part on the first and second temperature data. In accordance with one proposed embodiment, the computing system is configured to calculate the amount of electrical power to be supplied to the heater as a function of a difference between the first and second temperature data output by the first and second temperature sensors.

In accordance with some embodiments of the system described in the preceding paragraph, the heater comprises an infrared heater, while the first and second temperature sensors comprise first and second infrared temperature sensors respectively. The head may further comprise shielding disposed and configured to block radiation reflected by the substrate from reaching the first temperature sensor.

In accordance with one embodiment, the thermal model is configured to take into account a speed at which the head is moving and a number of plies of the substrate. Furthermore, the thermal model may be configured to calculate a difference between the estimated compaction point temperature and a target compaction point temperature.

Another aspect of the subject matter disclosed herein is a method for controlling a heater during placement of tows of fiber-reinforced plastic material by a fiber placement machine. The method comprises: (a) creating a thermal model that correlates a temperature of a compaction point under a compaction roller to at least a first temperature of a substrate in a first measurement spot, wherein the first measurement spot is located either forward of the compaction roller and aft of the heater or aft of the compaction roller when the compaction roller is in contact with the substrate; (b) compacting tows of fiber-reinforced plastic material on the substrate by rolling the compaction roller on a surface of the substrate with the tows therebetween; (c) heating the substrate in an area upstream of the first measurement spot during compaction using an electrically powered heater; (d) acquiring a first temperature measurement from the first measurement spot; (e) using the thermal model to infer an estimated compaction point temperature that is a function of at least the first temperature measurement; (f) calculating a difference between the estimated compaction point temperature and a target compaction point temperature; (g) issuing control signals that represent a command to supply an amount of electrical power to the heater, which amount of electrical power is calculated to reduce the difference between the estimated compaction point temperature and the target compaction point temperature; and (h) supplying the amount of electrical power to the heater, wherein steps (e) through (g) are performed by a computing system.

In accordance with some embodiments of the method described in the preceding paragraph, the thermal model also correlates the temperature of the compaction point to a second temperature of the substrate in a second measurement spot, wherein the second measurement spot is located forward of the compaction roller and aft of the heater if the first measurement spot is aft of the compaction roller or aft of the compaction roller if the first measurement spot is forward of the compaction roller and aft of the heater when the compaction roller is in contact with the substrate, and step (e) comprises using the thermal model to infer an estimated compaction point temperature that is a function of a difference of the first and second temperature measurements.

A further aspect is a method for controlling a heater during placement of tows of fiber-reinforced plastic material by a fiber placement machine, comprising: (a) compacting tows of fiber-reinforced plastic material on a substrate supported by a tool by rolling a compaction roller on a surface of the substrate with the tows therebetween; (b) heating the substrate in an area upstream of the compaction roller using an electrically powered heater; (c) acquiring a first temperature measurement from a first measurement spot on a portion of the substrate located aft of the heater and forward of the compaction roller; (d) acquiring a second temperature measurement from a second measurement spot on a portion of the substrate located aft of the compaction roller; (e) inferring an estimated compaction point temperature that is a function of at least one of the first and second temperature measurements; (f) calculating a difference between the estimated compaction point temperature and a target compaction point temperature; (g) issuing control signals that represent a command to supply an amount of electrical power to the heater, which amount of electrical power is calculated to reduce the difference between the estimated compaction point temperature and the target compaction point temperature; and (h) supplying the amount of electrical power to the heater, wherein at least steps (e) through (g) are performed by a computing system. In accordance with some embodiments, step (c) comprises radiating the substrate with infrared radiation. In accordance with one example implementation, the method further comprises calculating the amount of electrical power to be supplied to the heater as a function of a difference between the first and second temperature data output by the first and second temperature sensors.

Other aspects of systems and methods for controlling the temperature at the compaction point in an AFP machine are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, systems and methods for closed-loop control of the temperature at the compaction point in an AFP machine will now be described in some detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The particular exemplary embodiments disclosed below are based on the following overall control philosophies: (1) IR temperature sensors are used to detect substrate temperature; (2) mounting and shielding are controlled to prevent reflected photons from impinging on the IR temperature sensors; (3) the substrate temperature is characterized as a function of heater power, compaction roller velocity and number of plies in the substrate; (4) a thermal model is developed which relates measured temperatures to actual process temperatures; (5) an open loop control scheme is run when the temperature data is not valid; (6) a closed loop control scheme is run to trim temperature when the temperature data is valid; and (7) live data from the robot and numerical control (NC) programming are also used as process controls.

In accordance with one embodiment, the inputs to the controller system include the following: (1) at least one pyrometer (hereinafter "temperature sensor") to measure material temperature near the compaction roller (more than one can be used to measure in front of the roller, behind the roller, and at the left and right edges of the roller); (2) a thermal model that predicts the material temperature based on heater output, process speed, tooling material, number of plies over the tool, distance of the heater to the substrate, and orientation of the heater to the substrate; (3) NC program data that passes the orientation of the heater to the substrate to account for complex contours; (4) robot status data for speed, position, and acceleration; (5) number of plies previously placed, as presented by the NC program; (6) substrate material emissivity; (7) NC program data defining which tows are being processed by the head; (8) compaction roller temperature; and (9) substrate temperatures as measured by the temperature sensors. The control computer processes these inputs and outputs control signals representing the commanded heater power level.

Figure 1:
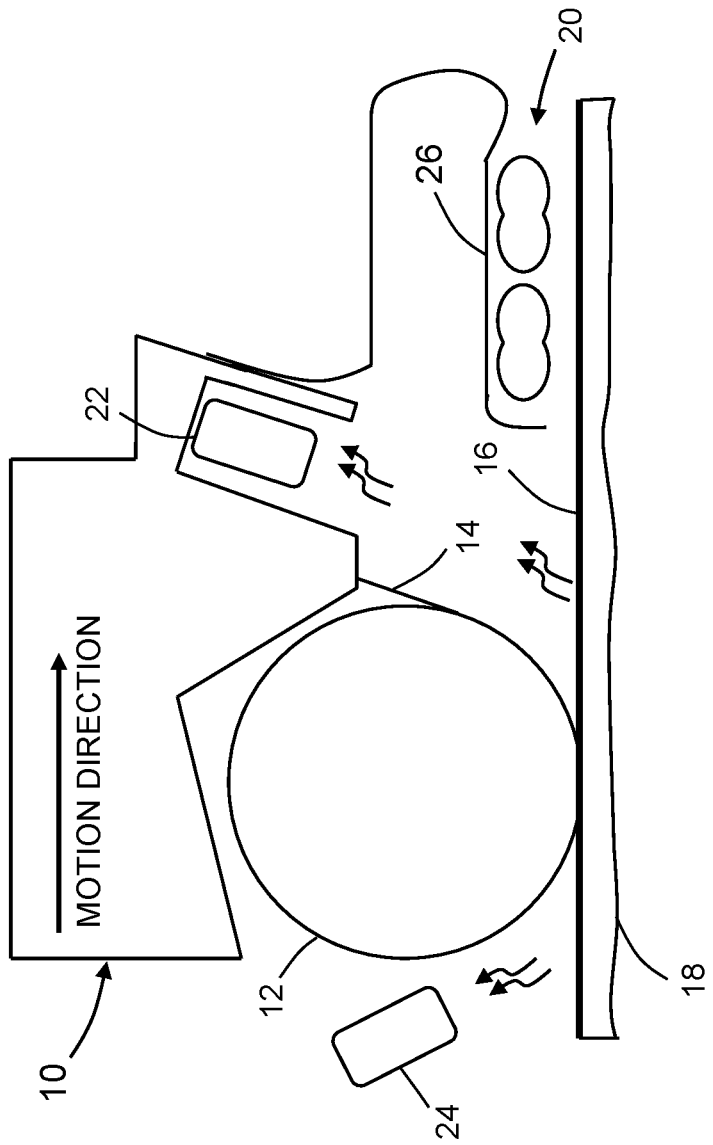
FIG. 1 is a diagram showing a side view of a head of an AFP machine in the process of laying a tow of fiber-reinforced plastic material on a substrate. The head comprises a compaction roller, an infrared heater and IR temperature sensors.

FIG. 1 is a diagram showing a side view of a head 10 of a robotic AFP machine in the process of laying a tow 14 of fiber-reinforced plastic material on a substrate 16 in accordance with one embodiment. The head is moving in the direction indicated by a horizontal arrow in FIG. 1. The head 10 comprises a compaction roller 12 and is equipped with an infrared heater 20 (e.g., a plurality of infrared bulbs) and a multiplicity of IR temperature sensors mounted in strategic locations. The multiplicity of IR temperature sensors includes a first row of spaced-apart IR temperature sensors 22 (only one of which is visible in FIG. 1) in front of the compaction roller 12 and a second row of spaced-apart IR temperature sensors 24 (only one of which is visible in FIG. 1) behind the compaction roller 12. In accordance with one embodiment, both rows have three IR temperature sensors. The IR temperature sensors 22 measure the substrate temperature after heating and before compaction; the IR temperature sensors 24 measure the substrate temperature after heating and after compaction. Other IR temperature sensors for measuring the substrate temperature before heating and any changes in the temperature of the compaction roller are not shown in FIG. 1.

A typical IR temperature sensor comprises a lens, a spectral filter that selects the wavelength spectrum of interest, an optical detector that converts the infrared radiation into an electrical signal, and an electronic signal processing unit that analyzes the electrical signal and converts it into a temperature measurement. Such an IR temperature sensor has the capability to measure temperature without touching an object. For example, suitable IR temperature sensors are commercially available from Fluke Process Instruments N.A., Santa Cruz, Calif.

Reflection of infrared energy from the substrate 16 into the IR temperature sensors 22 would prevent adequate control. To avoid this situation, bulb shielding 26 is disposed and configured to block infrared energy reflected by the substrate 16 from reaching the IR temperature sensors 22. More specifically, the infrared heater 20 is attached to bulb shielding 26, which is in turn attached to the head 10 of the AFP machine. Preferably the optical detector of each of the IR temperature sensors 22 is capable of forming a reasonable measurement spot size given the close mounting position and the desire to minimize observation of reflected energy.

The substrate 16 comprises a multiplicity of tows of fiber-reinforced plastic material previously laid on a tool 18 (e.g., a mandrel). The tows form plies of composite material. As the head 10 moves in the direction indicated by the arrow in FIG. 1, one or more additional tows 14 are laid on the substrate 16. The infrared bulbs 20 in front of the compaction roller 12 heat the substrate 16 in order to enhance material tack prior to laminating a new ply over the substrate 16. The plies of composite material will be cured in an autoclave after the layup process has been completed.

The primary variable that controls part quality for fiber placement is the substrate temperature under the compaction roller 12 during compaction (hereinafter "compaction point temperature"). However, the compaction point temperature cannot be measured in real-time. The methodology for heating proposed herein infers (i.e., estimates) the substrate temperature under the compaction roller 12. More specifically, 2-D thermal modeling is used to correlate the compaction point temperature to the temperature readings of the IR temperature sensors 22 and 24. The proposed methodology controls this primary parameter (i.e., compaction point temperature) in a closed-loop heater control system such that optimal processing conditions can be maintained during the fabrication of composite structures in order to provide the optimal quality at the highest layup rates possible. More specifically, the closed-loop heater control system disclosed herein controls the heater output based on a combination of IR temperature sensor feedback, process models, NC programming data, ambient conditions, and material models to determine the optimal electrical power to supply to the infrared heater 20.

In accordance with one implementation adopted during development, eight IR temperature sensors were mounted to the head 10 of a robotic AFP machine. A first set of three IR temperature sensors 22 were mounted in front of the compaction roller 12. A second set of three IR temperature sensors 24 were mounted behind the compaction roller 12. Each IR temperature sensor of the first and second sets was pointed at a respective measurement spot on the substrate being processed. These measurement spots were located as close to the compaction roller 12 as possible. A seventh IR temperature sensor (not shown in FIG. 1) was mounted out in front of the infrared heater 20 to measure the substrate temperature before heating. The last IR temperature sensor (not shown in FIG. 1) was mounted near the compaction roller 12 and positioned so as to measure any changes in the temperature of the compaction roller 12.

The IR temperature sensors 22 between the compaction roller 12 and the infrared heater 20 enable close monitoring of substrate temperatures, which can increase as they accrue repeated heating cycles. The IR temperature sensors 24 behind the compaction roller 12 provide a reliable, reflection-free reading that is a lagging indicator of heater response. The IR temperature sensors 22 and 24 are preferably located so that they are between ±45 degrees of perpendicular to the surface. In addition, the compaction point is the region of interest, so pointing the sensors as close as possible to the nip improves the system performance.

In accordance with various embodiments of the heater control system disclosed herein, the number of temperature sensors may be different than eight. For example, the thermal model may be configured to infer an estimated compaction point temperature as a function of one or more temperature sensors directed at respective measurement spots located forward of the compaction roller and aft of the heater (and not as a function of any temperature sensors directed at respective measurement spots located aft of the compaction roller). In an alternative example, the thermal model may be configured to infer an estimated compaction point temperature as a function of one or more temperature sensors directed at respective measurement spots located aft of the compaction roller (and not as a function of any temperature sensors directed at respective measurement spots located forward of the compaction roller and aft of the heater).

Figure 2:
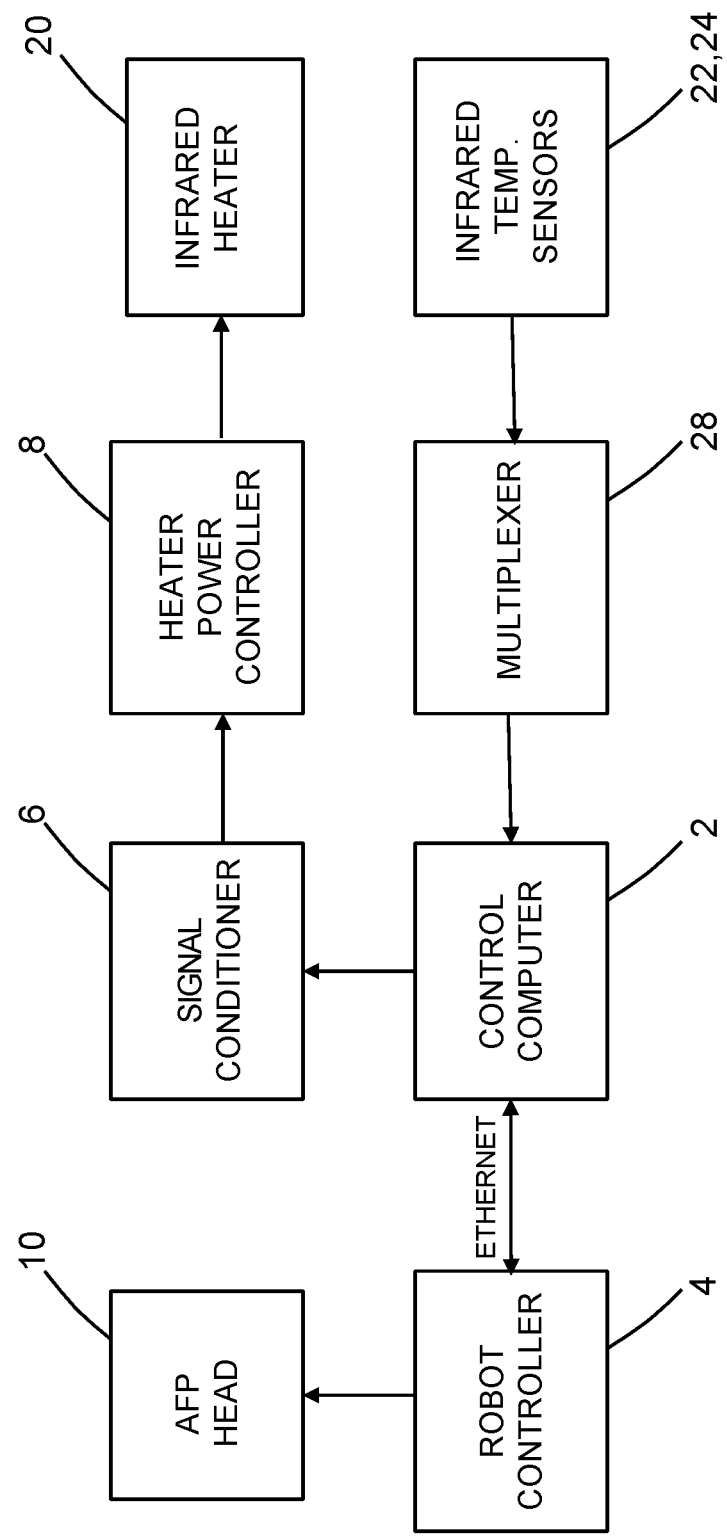
FIG. 2 is a block diagram identifying some components of a closed-loop system for controlling the temperature at the compaction point in an AFP machine in accordance with one embodiment.

FIG. 2 is a block diagram identifying some components of a closed-loop system for controlling the temperature at the compaction point in an AFP machine. The overall system comprises a control computer 2 for controlling the infrared heater 20 and a robot controller 4 for controlling movement of the head 10 of the AFP machine. The robot controller 4 provides data to the control computer 2 over a network connection (e.g., an Ethernet connection). The robot controller 4 is programmed to provide speed and tow control output codes over the network connection to the control computer 2. In accordance with one embodiment, the control computer 2 is wired to a multiplexer 28 to read the IR temperature sensors 22, 24. The IR temperature sensors are also wired into the multiplexer 28.

The control computer 2 reads temperature data, robot data, and part program information and outputs heater power control signals that control the power supplied to the infrared heater 20 in a closed-loop control system. The heater power control signals are sent by the control computer 2 to a signal conditioner 6, which in turn outputs conditioned heater power control signals to a heater power controller 8. The heater power controller 8 is configured to convert conditioned heater power control signals to an output voltage which is used to power the infrared heater 20.

The control computer 2 is configured to employ a thermal model, in form of a set of algebraic equations, which incorporates respective thermal analysis results of the geometry and thermal properties of the tooling, layup, compaction roller and heater and their thermal interactions. The thermal model receives input variables (including the IR temperature sensor readings) and then estimates the substrate temperature at the interface of the compaction roller 12 and the substrate 16 (hereinafter "the compaction point" or "nip"). The input variables include tool/layup model data such as the number of plies under the current layup (to account for variations in thermal flow), head (e.g., compaction roller) geometry data, temperature data (from the IR temperature sensors 22, 24 and optionally from the IR temperature sensor measuring the temperature of the compaction roller 12), and layup speed (supplied by the robot controller 4 continuously throughout the layup). In addition, the part and head geometries influence which, if any, IR temperature sensors 22 and 24 are pointed at the part. This data will be sent from the robot controller 4 to the control computer 2. The control computer 2 will use this information to disable IR temperature sensors that are not over the part surface and, therefore, not capturing meaningful data.

Figure 3:
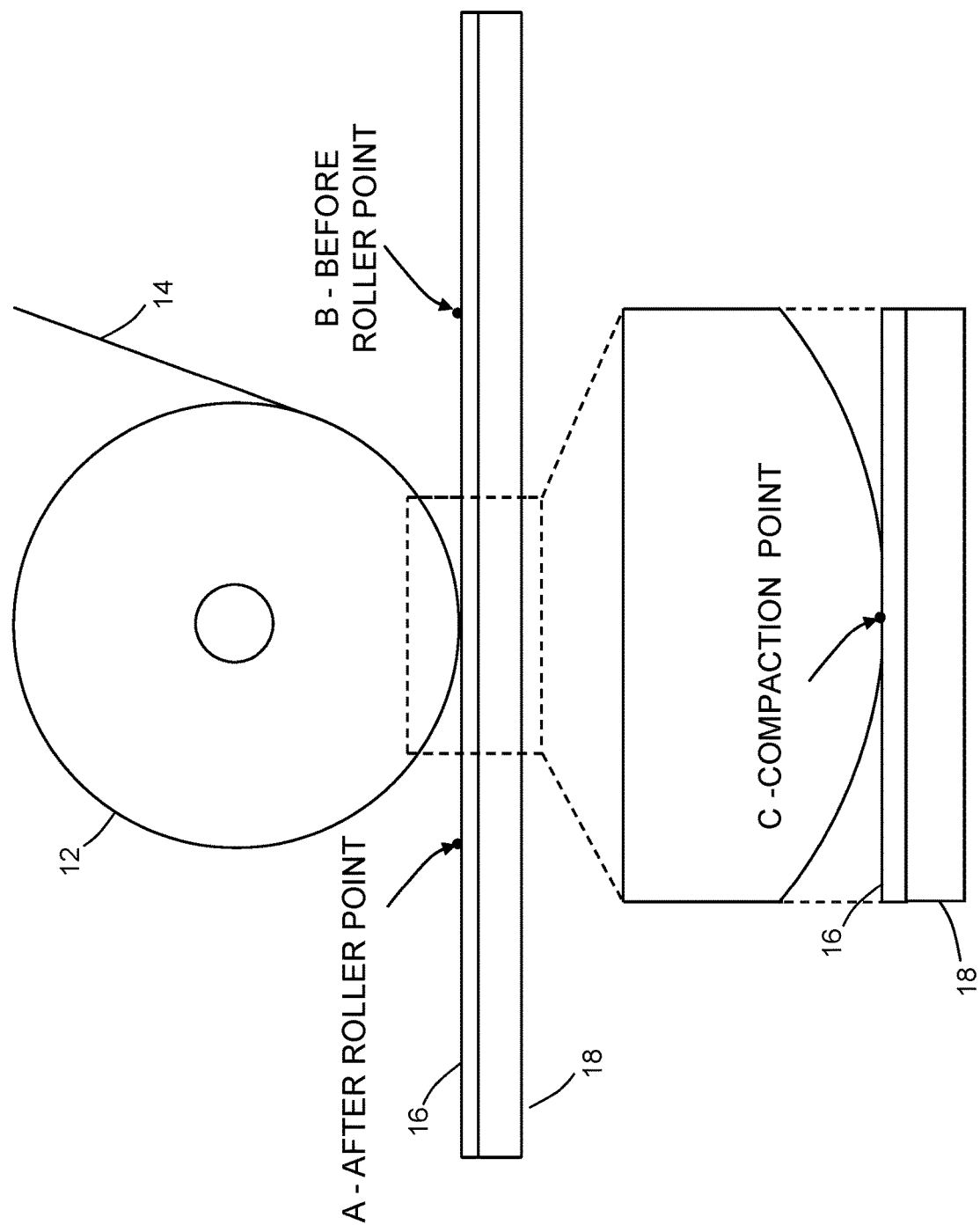
FIG. 3 is a diagram representing a sectional view of a polymeric (e.g., polyurethane) compaction roller being deformed in the compaction zone as it presses against a composite substrate laid on a tool made of metal (e.g., aluminum). Three points of interest are indicated as follows: A—aft roller sensing location; B—forward roller sensing location; and C—compaction point under roller.

FIG. 3 is a diagram representing a sectional view of a polymeric (e.g., polyurethane) compaction roller 12 being deformed in the compaction zone as it presses against a composite substrate 16 laid on a tool 18 made of metal (e.g., aluminum). Three points of interest are indicated in FIG. 3: A—aft roller sensing location; B—forward roller sensing location; and C—compaction point under the roller. The portions of the compaction roller 12, substrate 16 and tool 18 inside the dashed rectangle in the upper portion of FIG. 3 are shown on a magnified scale in the lower portion of FIG. 3. In this magnified portion, it can be seen that the portion of the outer circumference of the compaction roller 12 that contacts the substrate 16 in the compaction zone will become flattened. The temperature of interest, which is derived using the thermal model, is the temperature at the compaction point.

The thermal model assumes that the thermal process has already reached steady state. Hence, every point on the tape-laying path experiences the same temperature history, except for the absolute start time at each point. However in reality, steady state is not always true. For example, during the initial start-up paths when everything is cold (at ambient temperature). Also, other factors (such as substrate and roller temperatures) usually do not remain constant during the whole process and are difficult to account for in a 2-D steady-state thermal model. Accordingly, a differential approach was adopted using an empirically derived ratio R (approximately constant over the temperature ranges of interest) which equals the difference between the substrate temperatures at points A and C and the difference between the substrate temperatures at points A and B (i.e., $R=(T_C-T_A)/(T_B-T_A)$) to minimize errors from the model due to initial condition changes from time to time and path to path. In accordance with one proposed implementation, the thermal model uses the ratio R to estimate the compaction point temperature $T_C$ in response to input of all of the previously identified variables, including the current heater power and sensor readings (i.e., measured temperatures) $T_A$ and $T_B$. The thermal model is further configured to calculate a target heater power based on the deviation of the estimated compaction point temperature $T_C$ from a pre-specified compaction point temperature (selected from pre-stored curves) determined to be the optimal value for the applicable processing conditions.

The thermal model was used to develop control algorithms relating the speed, number of plies and heater power to the layup temperature under the compaction roller 12. These control algorithms are programmed into the control computer 2. In accordance with one embodiment, the control algorithms are implemented using a PID controller (incorporated in the control computer 2). A PID controller is a control loop feedback mechanism that continuously calculates an error value as the difference between a desired setpoint (e.g., a target compaction point temperature) and a measured process variable (e.g., the estimated compaction point temperature) and applies a correction based on proportional, integral, and derivative terms. In this case, the PID controller continuously calculates a difference between the current heater power and a target heater power determined using the temperature difference from the thermal model. The gains for the PID controller are tuned to ensure satisfactory control of the power supplied to the infrared heater 20. For example, those gains are tuned to address the thermal lag of the sensors and heater.

As can be seen in FIG. 1, the bulbs of the infrared heater 20 are spaced a certain distance apart. The irradiance pattern is roughly cylindrical for each element in each double bulb, so depending on the distance from the infrared heater 20, the overall heated area will vary, resulting in variation in the overall or average power density as a function of area. Testing was conducted to determine the energy absorption of the substrate at different power settings, substrate thicknesses, and delivery head feed rates. Using the mounted IR temperature sensors, a series of constant-velocity, constant-power tests were run over a varying number of substrate plies. Temperature data was acquired from respective areas before and after the compaction roller 12, both when laying material and when not laying material. The data collected in these tests was used to calibrate the efficiency of the infrared heater 20 over the entire heated zone as a function of power input and feed rate. This data was also used to derive the parameters for slope and intercept to determine heat input as a function of feed rate and target temperature.

Figure 9:
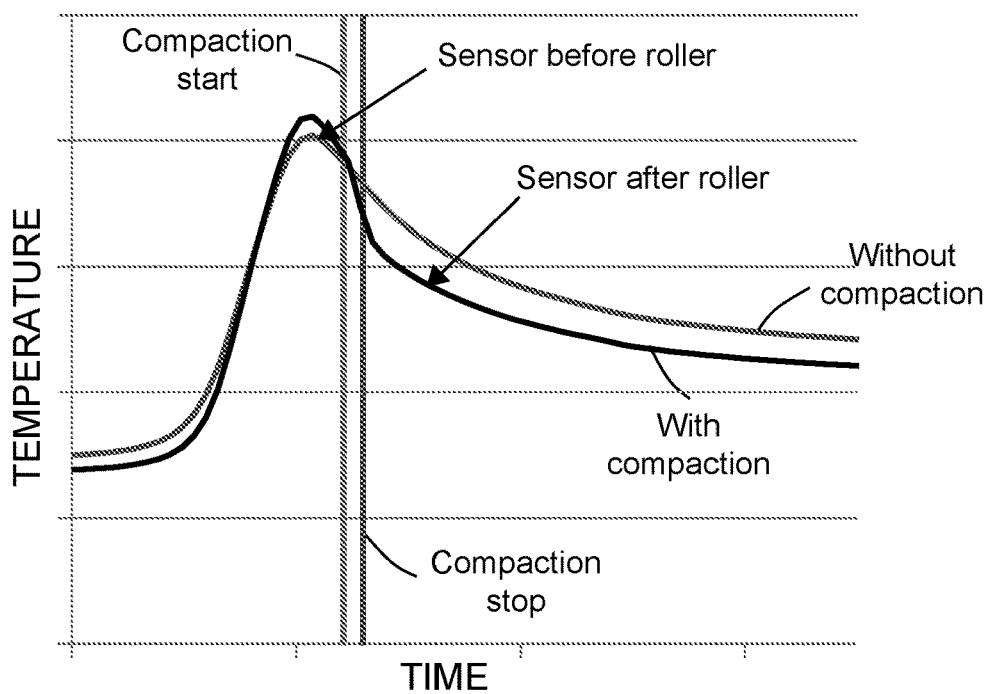
FIG. 9 is a graph of substrate temperature versus time during heating, cooling and roller compaction based on buried thermocouple data.

While not directly related to the heater characterization, the compaction roller 12 makes a significant contribution to the substrate temperature during processing. The actual processing temperature during fiber placement (that is temperature at the compaction point) is not when the material is at its warmest point. Since the compaction roller 12 is separated from the infrared heater 20 by a distance (see FIG. 1), there is a period of cooling that occurs before the compaction roller 12 compresses the new material onto the substrate 16 at the compaction point. This is the point at which the AFP process actually takes place. A test was developed to characterize the location of the compaction process in the temperature versus time plots of a single point along a course. This test involved placing a thermocouple (not shown in the drawings) along the centerline of a course and locating a compaction roller-actuated switch upstream a known distance, which produces a timing signal to calculate the position of the compaction roller 12 relative to the thermocouple data. A course was run over the test setup with the infrared heater 20 running in constant-power mode. Substrate temperature and the timing switch data were collected for the single course with the compaction roller 12 in contact with the substrate 16 under normal compaction loads. Data was collected on a second, identical pass, except that the compaction roller 12 was not in contact with and just barely above the surface of the substrate 16, to minimize effects of increased distance to the substrate. The results of this test are depicted in FIG. 9 (discussed in more detail below).

Figure 4:
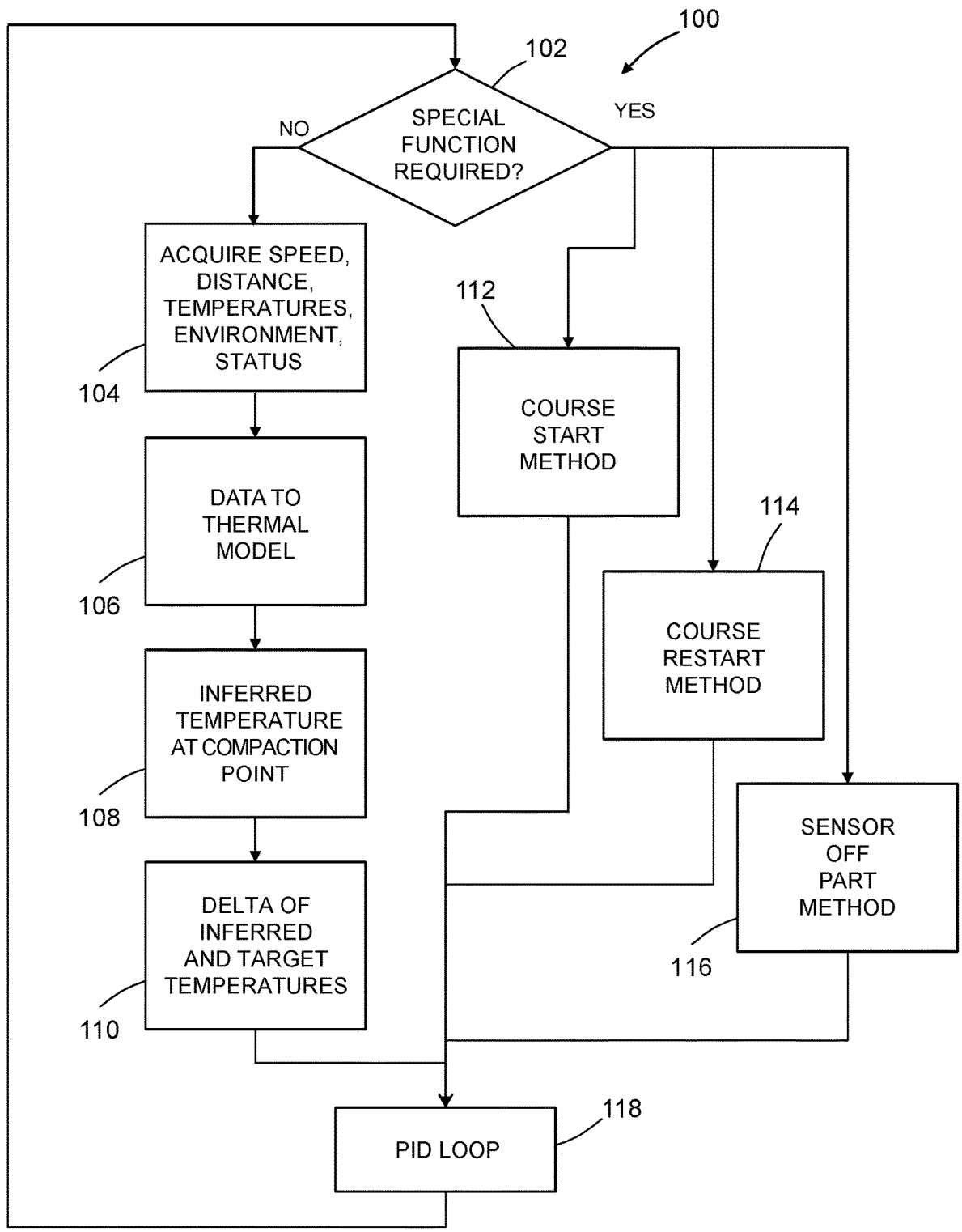
FIG. 4 is a flowchart identifying steps of an infrared heater master control process in accordance with one embodiment.

As previously described, the control computer 2 is programmed to control the power supplied to the infrared heater 20 during the laying down of tows and compaction of the substrate. FIG. 4 is a flowchart identifying steps of an infrared heater master control process 100 in accordance with one embodiment. The first branch point in this flow is the decision point 102, where a determination is made whether a special function is required or not. This branch handles those situations when the basic sensor feedback loop cannot be used. For example, when the sensors are not pointed directly at the layup, a special function Sensor Off Part Method 116 is employed. When the IR temperature sensors cannot be used, the control computer for the heater control system reverts to the traditional method using speed-based open-loop equations for power control. When the layup is starting a course add routine, a special function such as Course Start Method 112 or Course Restart Method 114 is employed.

The left branch in the flowchart seen in FIG. 4 is the method used when the sensors are valid (i.e., no special function is required). In this loop, the system acquires speed and tow status data from the robot controller and temperature data from the IR temperature sensors (step 104). This information is channeled to the thermal model equations along with the number of plies in the current layup (step 106).

Initially, heaters may be in operation at a low power (for example, during startup). After receiving all relevant data, the thermal model (in form of algebra equations in the system) infers (i.e., estimates) the compaction point temperature based on the temperature readings from the forward and aft IR temperature sensors 22 and 24 (step 108) and outputs a heater power level that should produce a desirable (pre-specified) compaction point temperature (hereinafter "target compaction point temperature"). Now the heater can operate at the power level dictated by the thermal model. However, as temperature readings continue to be received during heating of the substrate and operation of the AFP machine, the thermal model will continuously record and output signals representing the current difference (i.e., "DELTA" in FIG. 4) between the thermal model-predicted (i.e., estimated) compaction point temperature and the target compaction point temperature (step 110). The PID loop 118 incorporated in the control algorithms uses those changing deviations to continuously fine-tune (i.e., apply a small correction to) the heater power level to achieve or maintain the target compaction point temperature. The estimated compaction point temperature $T_C$ is calculated using the equation $T_C = T_A + R^*(T_B - T_A)$.

As shown in FIG. 4, the special functions at the start and end of a course and during off-part motion are controlled in the open-loop method. Only when the head is laying material and temperature data is valid is the closed-loop control implemented.

Figure 5:
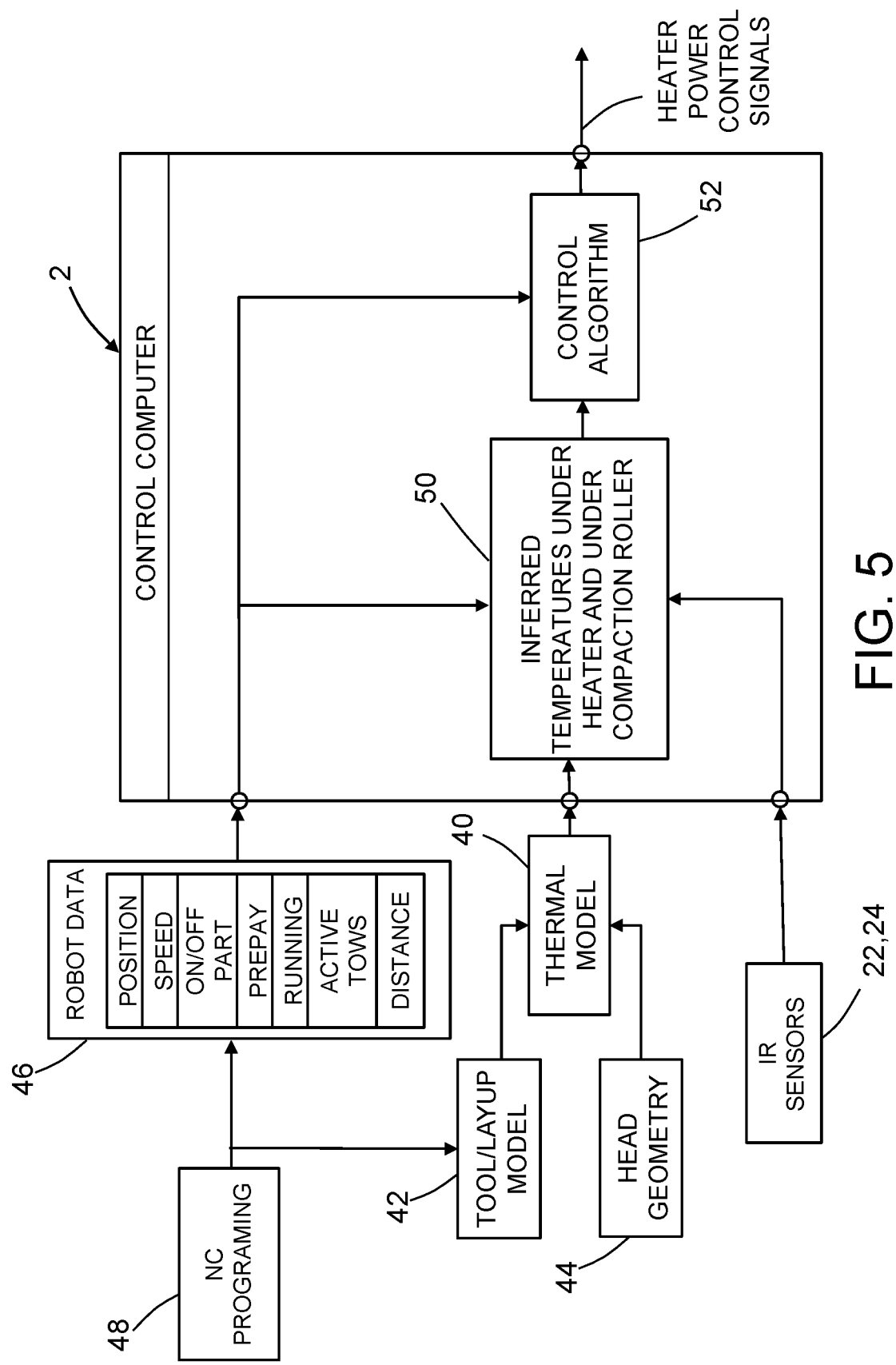
FIG. 5 is a block diagram identifying some data inputs and some components of a control computer configured to control an infrared heater in accordance with one embodiment.

FIG. 5 is a block diagram identifying the data inputs to and algorithms executed by a control computer 2 configured to output infrared heater power control signals in accordance with one embodiment. This closed-loop heater control system uses a thermal model 40 (previously described) that can be loaded into the memory (e.g., random access memory) of the control computer 2. The thermal model 40 takes into account a tool/layup model 42 (which provides the number of plies in the current layup) and a head geometry model 44, both of which can be retrieved from a non-transitory tangible computer-readable storage medium (not shown). The tool/layup model 42 includes information from the NC programming 48. In addition, the thermal model 40 (when loaded into the control computer 2) receives robot data inputs 46 (such as speed and position of the head 10, distance separating the heater and the substrate, and the number of active tows) from the robot controller 4 (see FIG. 2) and temperature data from the IR temperature sensors 22, 24. The thermal model 40 comprises equations configured to output temperature estimates 50 based on the variables input to the thermal model 40. These temperatures estimates 50 include the inferred substrate temperature under the compaction roller 12 and the inferred substrate temperature under the infrared heater 20.

The thermal model 40 receives inputs from the IR temperature sensors (including IR temperature sensors 22, 24 and the other IR temperature sensors). More than one IR temperature sensor can be used to measure material temperature in front of the compaction roller, behind the compaction roller, and at the left and right edges of the compaction roller. In addition to the temperature measurements from the IR temperature sensors, the thermal model 40 is configured to take into account the number of plies previously placed, as presented by the NC programming 48, and the substrate material emissivity, which information is included in the tool/layup model 42. To account for complex contours in the tool 18, the control computer 4 receives robot data 46 representing the real-time position, speed and acceleration of the AFP head 10, the real-time distance and orientation of the infrared heater 20 relative to the substrate, the number of active tows being processed by the AFP head 10. Using the received information, the thermal model 40 estimates the substrate temperature under the compaction roller 12.

The control computer 2 further executes control algorithms 60 which are configured to maintain the optimal heating conditions for the fiber placement of thermoset prepreg materials in response to receipt of the temperature estimates 50. The control computer 2 processes the inputs in real-time and outputs control signals indicating the heater power needed to reach the target substrate temperature at the compaction point. The control algorithms 52 include a PID controller. Based on the difference between the estimated and target compaction point temperatures, the PID controller generates heater power control signals for changing the electrical power supplied to the infrared heater 20 in a manner that reduces the difference between the estimated and target compaction point temperatures. In addition, the estimated temperature under the infrared heater 20 can be used to prevent the material from exceeding maximum allowable temperatures.

Figure 6:
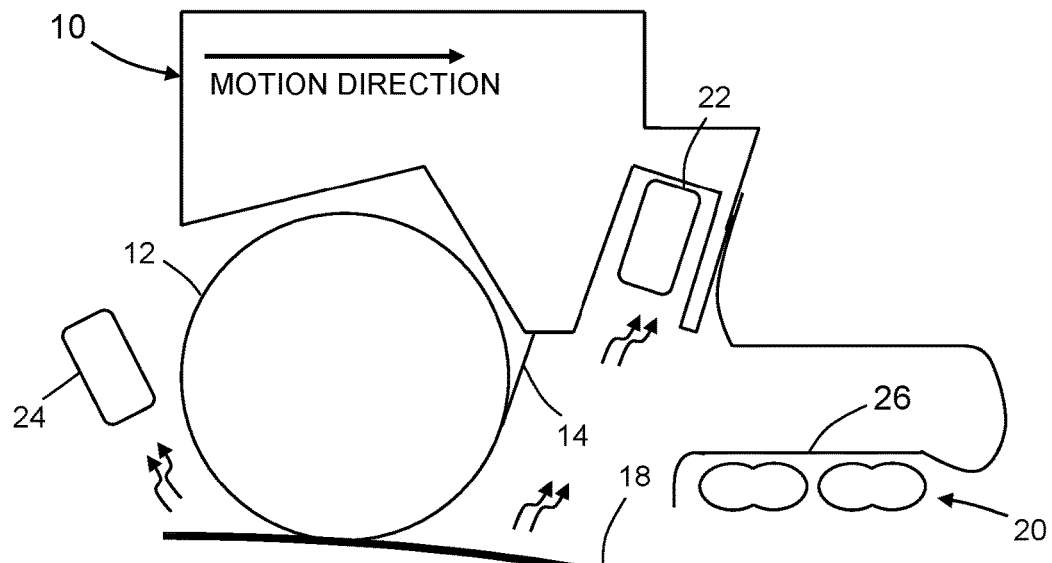
FIG. 6 is a diagram showing the same side view of the AFP head previously depicted in FIG. 1, except that in the scenario depicted in FIG. 6, the tool is further away from the infrared heater.
Figure 7:
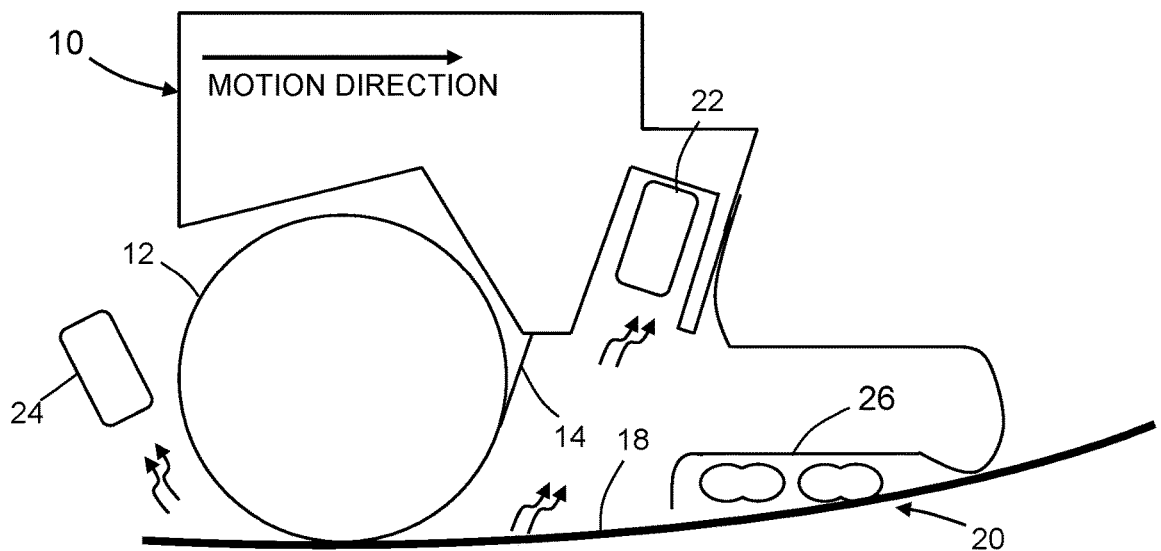
FIG. 7 is a diagram showing the same side view of the AFP head previously depicted in FIG. 1, except that in the scenario depicted in FIG. 7, the tool is closer to the infrared heater.

In particular, the control computer 2 is configured to control the infrared heater 20 based on the proximity of the tool 18. FIG. 6 is a diagram showing the same side view of the AFP head 10 previously depicted in FIG. 1, except that in the scenario depicted in FIG. 6, the tool 18 is further away from the infrared heater 20 due to the contour of the tool 18. Conversely, in the scenario depicted in FIG. 7, the tool 18 is closer to the infrared heater 20.

The distance separating the tool 18 and infrared heater 20 at the closest point (i.e., the minimal distance) can be calculated by the robot controller 4 (see FIG. 2) using information from the tool/layup model 42, information from the head geometry model 44 and head position data extracted from the NC programming 48 (which head position data is a component of robot data 46). To compensate for changes in the distance between tool 18 and infrared heater 20, the power supplied to the variable-power infrared heater 20 should be adjusted by control computer 2 to be inversely proportional to that distance. In accordance with alternative embodiments, the distance between tool 18 and infrared heater 20 can be measured using distance sensors (e.g., an optical detector head comprising an interferometer and a photodetector).

In accordance with one embodiment, there are three scenarios in which tows are being dispensed from the head. The IR temperature sensors 22, 24 need to be situated so that there is temperature data available to the control computer 2 for each scenario. The first scenario is when a course progresses down a tapered surface, and the outer tows are cut to narrow the band width accordingly. The other two scenarios are mirror images of each other, when tows are actively being placed either at one edge of the tow band or the other. For example, the last course at the end of a ply when the fiber path is parallel to the ply boundary, there may only be a few tows being placed. In this case, the outer tows are used, not the center tows, unless specifically selected by the NC programmer. Sensors are needed to measure substrate temperatures when the outer tows are being placed. In a proposed implementation, a 12-tow head would be used. Therefore, the three IR temperature sensors of each set (i.e., the set of IR temperature sensors 22 and the set of IR temperature sensors 24) would be located to sense the respective temperatures of tow #1, between tows #7 and #8, and tow #12. The seventh IR temperature sensor would be pointed at the back side of the compaction roller 12 to measure its temperature. And the last IR temperature sensor would be placed ahead of the infrared heater 20 to measure the substrate temperature prior to active heating.

During a fiber placement process, not all IR temperature sensors will be in a position to provide a valid reading. At the start and end of courses, as the head approaches or retracts from the surface, there can be reflections that are viewed by an IR temperature sensor. Also, the outboard IR temperature sensors (for example, the sensors positioned to measure with tow #1 or tow #12 in a 12-tow band) may not be viewing the area being processed because of the number of tows being placed. Additionally, at the beginning or end of the courses, the IR temperature sensors could be viewing the tooling 18, producing a non-relevant response. In accordance with one embodiment, means for determining when the IR temperature sensor is providing a valid signal are incorporated. The post-processing will be configured to read the NC program and insert codes for defining which sensors are producing valid signals.

Because there are three IR temperature sensors 22 in front of the compaction roller 12 and three IR temperature sensors 24 behind the compaction roller 12, means for integrating the signals of the three aft and three forward IR temperature sensors into a usable input for the control algorithms 52 are included in the software. For example, if all three IR temperature sensors 22 in front of the compaction roller 12 are producing different temperatures, a method for producing a common signal to the control computer 2 is desirable. In accordance with one technique, the center IR temperature sensors can be used to drive the control algorithm.

The purpose of thermal modeling is to provide the AFP machine with an accurately predicted temperature at the compaction point in relation to the before- and after-roller IR temperature sensor measurements. A two-dimensional finite element model (FEM) was built parametrically and analyses were carried out to predict the compaction point temperature as a function of processing speed and power output of the infrared heater 20. The FEM simulation also accounted for heat loss due to roller contact and the effect of number of plies already laid up.

Figure 8:
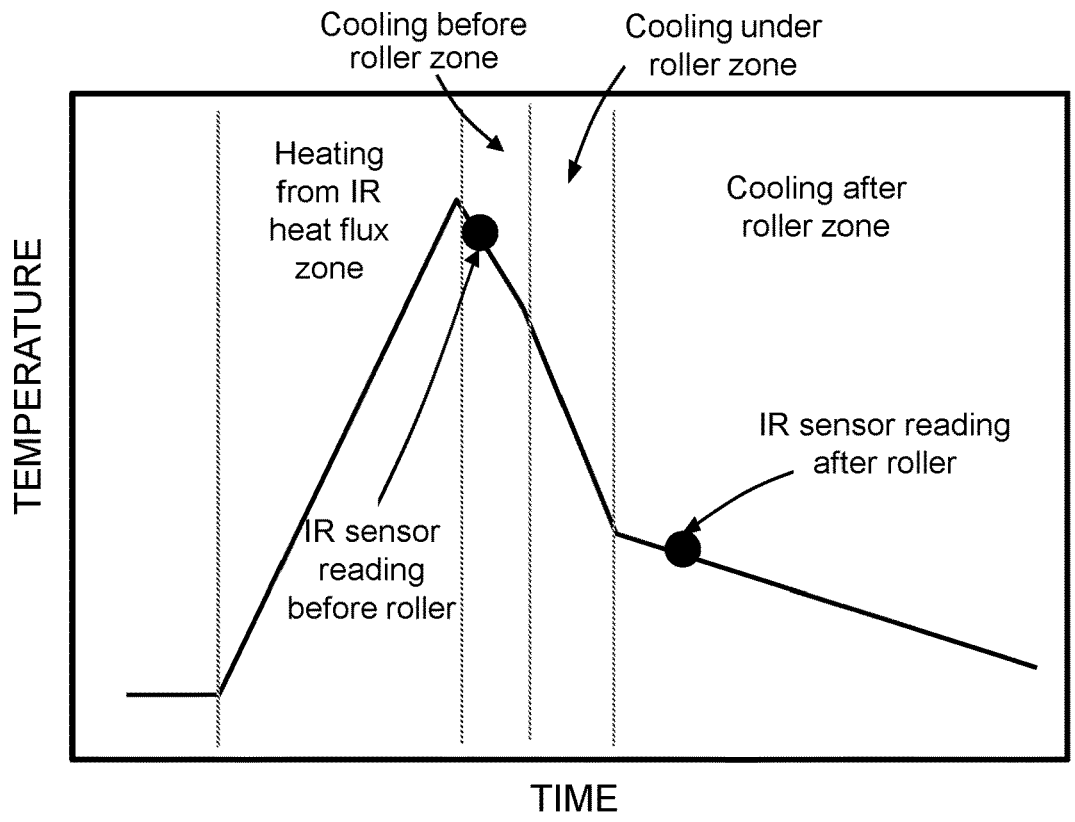
FIG. 8 is a graph showing a conceptualized temperature history at any point on the layup course.

By considering the physical process of fiber placement, a conceptualized temperature history at any point on the layup course can be derived. FIG. 8 is a graph showing a conceptualized temperature history at any point on the layup course. The reading from the IR temperature sensors 22 before the compaction roller 12 (indicated by the leftmost shaded dot in FIG. 8) is slightly to the right of the peak due to the lagging distance between the sensing location and the trailing edge of the infrared heater 20. Roller contact occurs at the change of the slope point and lasts for a certain time depending on the contact length and speed. After roller contact, natural cooling via convection continues and the reading from the IR temperature sensors 24 after the compaction roller 12 (indicated by the rightmost shaded dot in FIG. 8) is acquired. In summary, the task for thermal modeling is to analytically simulate this temperature history curve and develop equations for predicting the compaction point temperature, defined as the temperature at the start point of the cooling under the roller zone, as indicated in FIG. 8. Further details regarding the technical approach in simulating the actual process will be provided below.

The heater control system disclosed herein relies on open-loop algorithms to manage the off-part heater controls as well as the transition regions when material is being placed but the IR temperature sensors are not providing valid data due to their locations, such as at the start and end of a course. The control architecture also relies on the open-loop algorithms to provide a target power setting based on the AFP head velocity, and the PID closed-loop controller varies the actual power setting based on the target, to achieve the commanded substrate temperature. Infrared camera data was collected to understand the profile of the heat-affected zone of the heater system installed on the robotic AFP system. In accordance with one prototype, the heater bulbs were 6 inches wide, while the delivery head was designed for twelve tows of ½-inch width, for a band width of 6 inches. The infrared images acquired showed that this heater did not produce a uniform temperature across the entire 6-inch band width. There was about a 40° C. difference in temperature from the center of the heater area to the outer edge where the outer tows are placed. Since this was a static test, the actual temperatures recorded were not representative of the actual substrate temperature expected during fiber placement, but were instead an indicator of the heater uniformity. To mitigate this variability, infrared bulbs that are wider than the band width of the material can be utilized. In accordance with one embodiment, the thermal model can be configured to use the center IR temperature sensors exclusively.

At the end of the course, material temperatures drop and then spike when the AFP head 10 comes to the end of the course and is lifted off. This action produces a temperature transient. The closed-loop system may be configured to ignore the incoming data when it is no longer valid, such as when retraction of the AFP head 10 from the surface produces a temperature transient.

As part of the process of calibrating the thermal model, tests were conducted to measure the temperatures of the areas detected by the forward center and aft center IR temperature sensors. There was a significant drop in substrate temperature between the forward and aft sensors. The actual process occurs at the point of compaction and is the desired point of control for the closed-loop system. However, that point cannot be measured. For this reason, a thermal model was developed to understand the relationship between the sensor readings before and after the roller and the temperature at the compaction point. From the thermal model, an inferred compaction point temperature can be calculated and used to drive the heater control system to produce a desired compaction point temperature. The thermal model may be configured to replicate the conditions of actual testing. The temperature data acquired during the test was also used to calibrate the heater efficiency values in the thermal model.

The previously mentioned testing was conducted while not laying tow. Some of the testing was repeated while laying tow. For a substrate of four or eight plies, the measured substrate temperature varied by a number of degrees Celsius compared to when not laying tow. This data was also used to calibrate the thermal model.

Another example of the effects of the compaction roller 12 is shown in FIG. 9, which is a graph of substrate temperature versus time during heating, cooling and roller compaction based on buried thermocouple data. The plots show the substrate temperature as measured by a thermocouple on the ply below the surface, as the infrared heater 20 and compaction roller 12 pass over the thermocouple. The line labeled "With compaction" is data collected with the roller in contact with the surface. The line labeled "Without compaction" is data collected with the roller just barely off the surface. The two vertical lines represent the boundaries of the time interval (bounded by a "Compaction start" time and a "Compaction stop" time) during which the material was being compacted by the roller. The arrows approximate where the forward and aft IR temperature sensors are pointed. In this plot, the temperature at the compaction point quickly drops when the material is under compaction by the roller. Here the roller is quenching the material. When re-run without roller contact, no quenching occurred. Also evident in this plot is that the substrate temperature begins to cool prior to compaction, due to the proximity of the heater to the compaction point.

Figure 10:
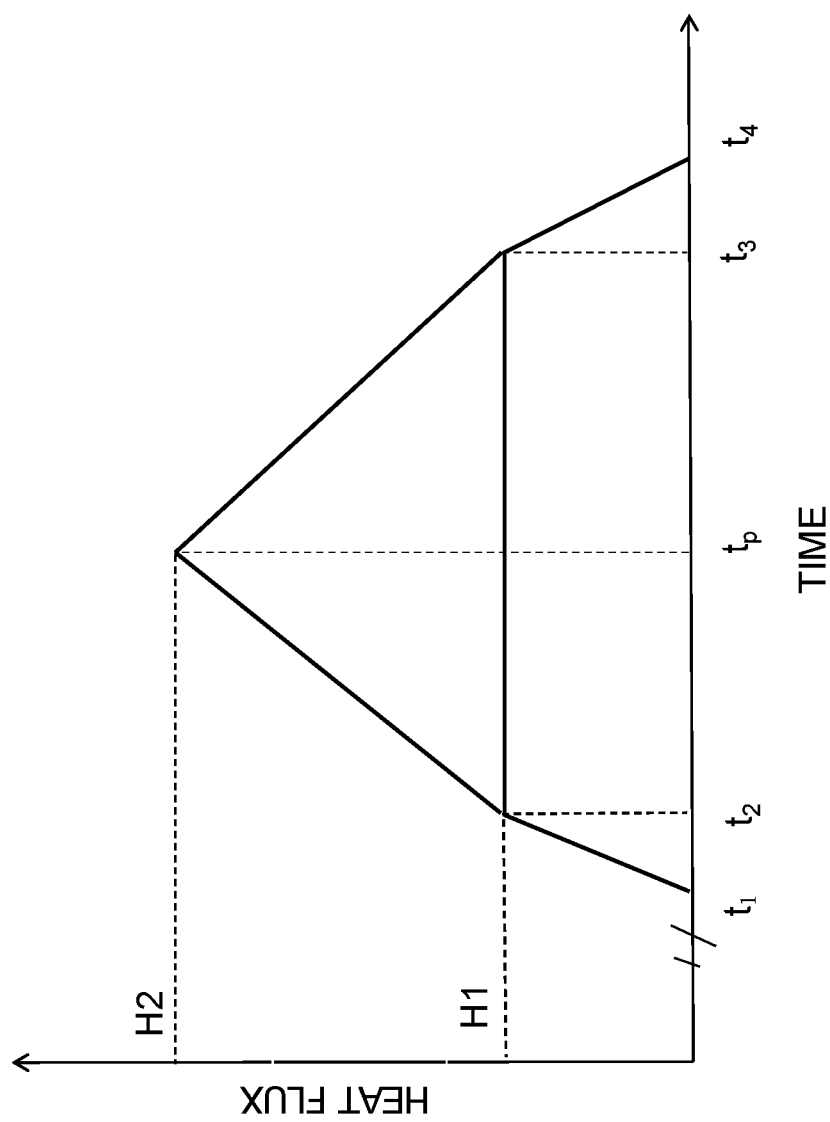
FIG. 10 is a graph showing a conceptualized time history of heat flux on each surface element.

Given the two infrared-bulb configuration of the infrared heater depicted in FIG. 1, it is reasonable to assume that the heat flux at the center of the heated compaction zone is higher than that at the edges. In constructing a thermal model for the purpose of initial development, the approximated spatial heat flux distribution was further approximated into a heat flux time history that every surface element experiences when the heater moves from left to right. FIG. 10 is a graph showing a conceptualized time history of heat flux on each surface element. In this developmental example, the average heat flux was H, H1=0.5 H, H2=1.5 H, and H2=3H1. The parameter $t_1$ is the delay time that controls the beginning of heating according to the location of a particular surface element and the heater moving speed. The parameter $t_4$ is the delay time that controls the end of heating. The heat flux peaking time $t_p=t_1+L_H/(2V)$, where $L_H$ is the heating length and V is the speed of the moving heater. $\Delta t = t_2 - t_1 = t_4 - t_3$ is a negligible ramp time for computational purposes only. An empirical approach was taken to derive the relationship between the heater power output and the heat flux, which was found to be roughly linear. Through running the actual process at different speeds, an empirical efficiency coefficient C(V, d) was obtained that regulates the actual heat flux applied to the thermal model, where d is the distance between the lamp surface and the surface of the top ply of the substrate. In accordance with one proposed embodiment of a method of characterizing the heat flux profile, a thermal profile was designed which is focused on calculating the heat profile based on bulb characteristics like view factor, number of bulbs, curvature of tool, and distance of heater to tool.

Figure 11:
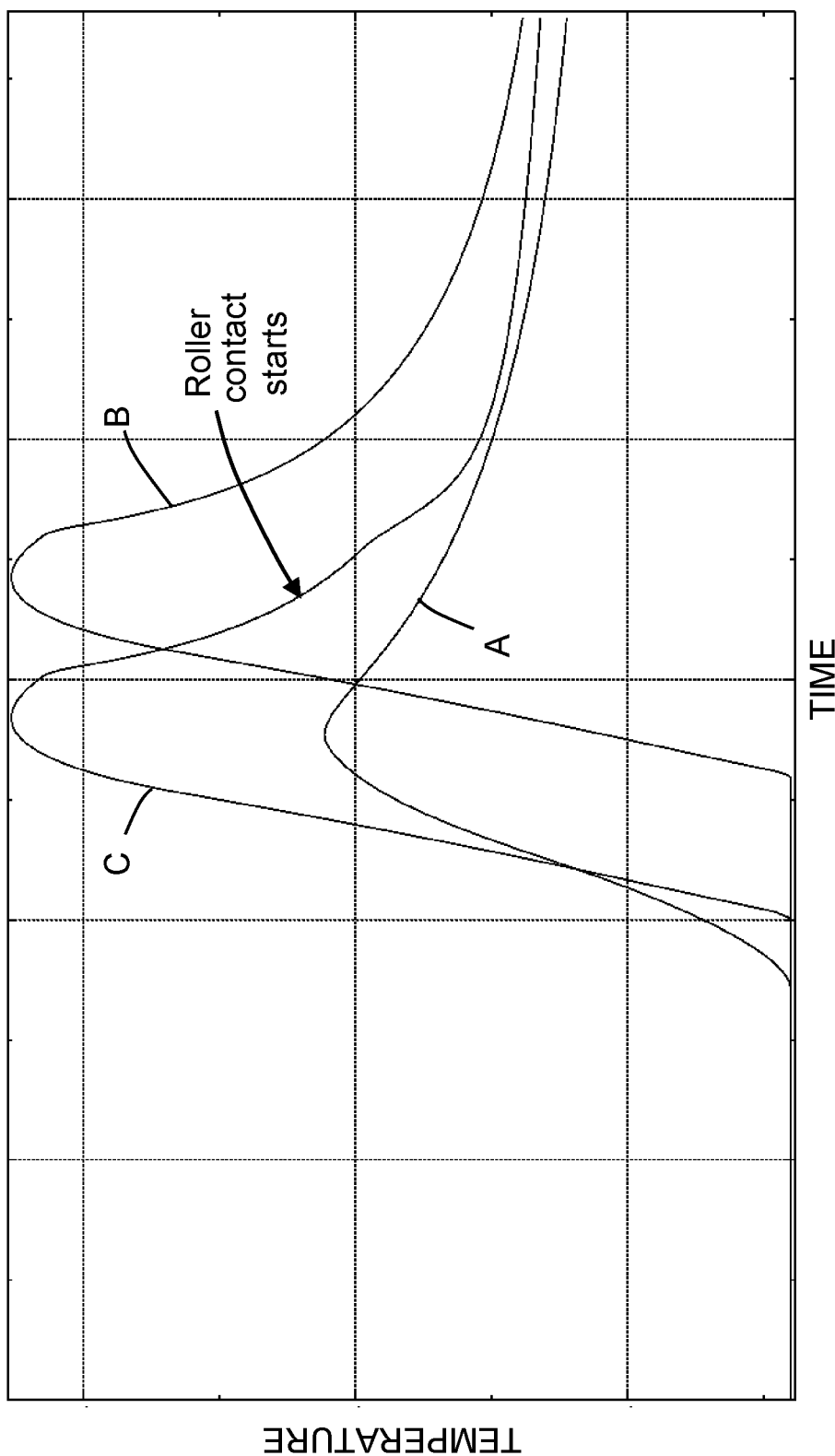
FIG. 11 is a graph showing temperature-time histories for the three points of interest (A, B and C) indicated in FIG. 3

FEM analyses were carried out to predict the compaction point temperature as a function of processing speed and power output of the infrared heater 20. The FEM simulation also accounted for heat loss due to roller contact and the effect of the number of plies already laid up. FIG. 11 shows temperature-time histories at the three points of interest (A, B and C, see FIG. 3) when the heater was moving at 0.1 m/sec and power output was 100%. The forward roller sensing location B curve is basically an offset from the compaction point C curve before the roller contact, which is only introduced at compaction point C. The aft roller sensing location A is cooler than compaction point C and forward roller sensing location B because it is on top of the prepreg ply just laid down with the same initial temperature as the ambient temperature.

Figure 12:
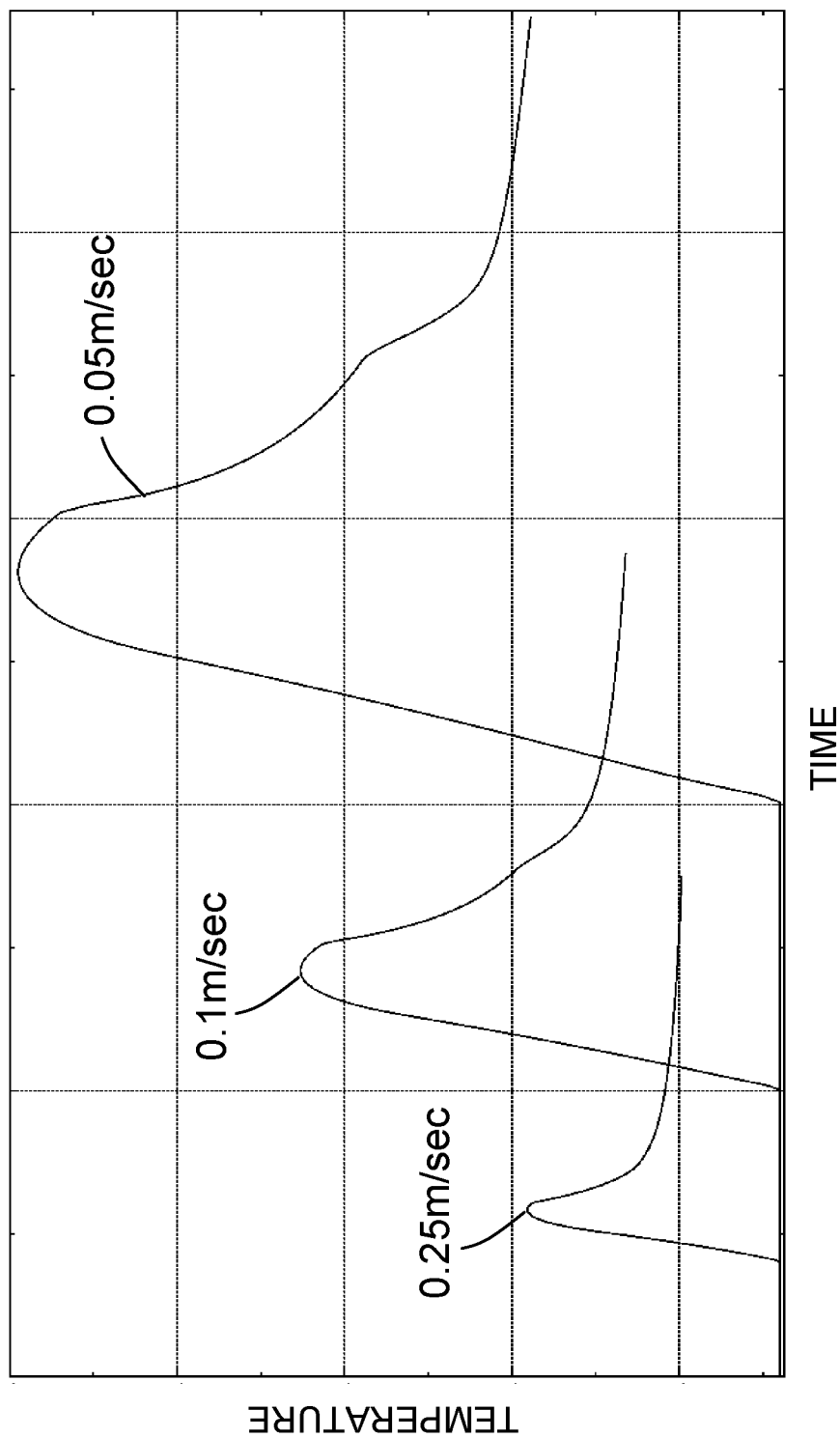
FIG. 12 is a graph showing temperature-time histories at the compaction point for heater (i.e., head) speeds of 0.05 m/sec, 0.1 m/sec and 0.25 m/sec.
Figure 13:
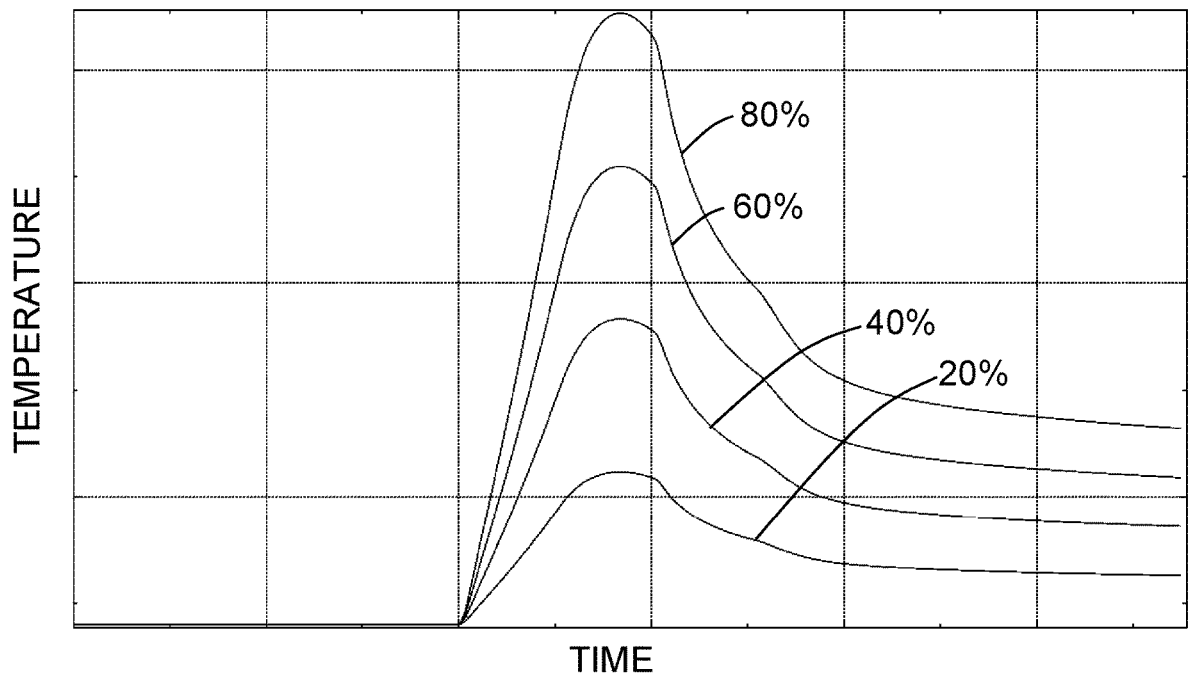
FIG. 13 is a graph showing temperature-time histories at the compaction point for heater power output percentages of 20%, 40%, 60% and 80% (heater speed of 0.1 m/sec).

FIG. 12 shows the effect of processing speed on the compaction point temperature (point of interest C), with 100% power output. As expected, when processing speed increases from 0.05 m/sec to 0.1 m/sec and 0.25 m/sec, the compaction point temperature decreases. (These low speeds were selected for the purpose of simulation only; fiber placement typically occurs at faster speeds, e.g., 0.5 or more meters per second.) FIG. 13 demonstrates the effect of power output on compaction point temperature, which scales linearly with the power output percentage. Again, the data shown in FIGS. 12 and 13 were derived using FEM simulation.

Figure 14:
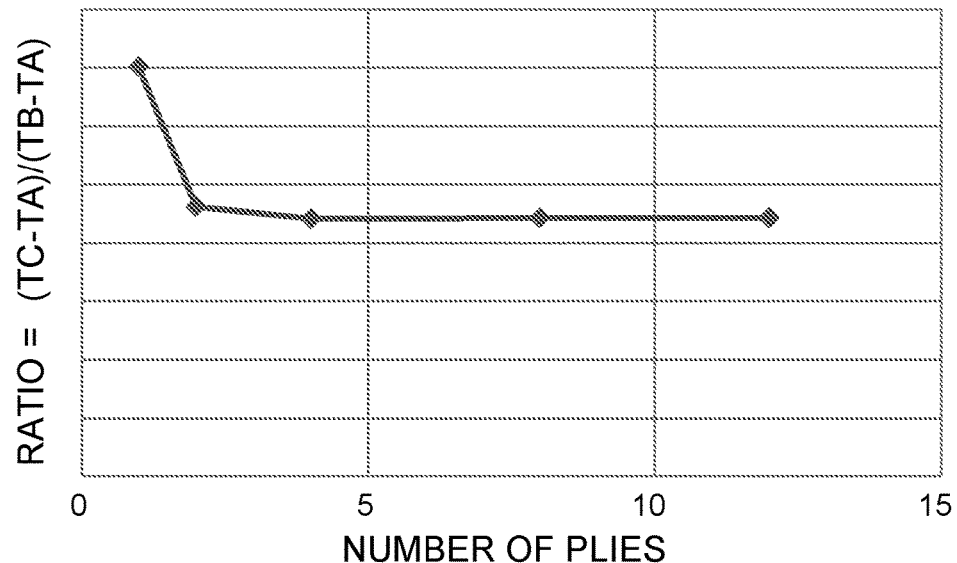
FIG. 14 is a graph showing the ratio of the temperature difference between points C and A shown in FIG. 3 over the temperature difference between points B and A shown in FIG. 3 as a function of number of plies laid down (heater speed of 0.1 m/sec).

The parametric study results for a compaction point temperature control system in accordance with one FEM simulation led to the following conclusions: (a) temperature rise at each of the points of interest is linearly proportional to power output; (b) compaction point (C) temperature is closer to the aft roller sensing point (B) due to roller contact cooling and the fact that point B is located closer to compaction point C than point A; (c) there is essentially no difference when the number of laid-up plies is more than four because the through-the-thickness transient heat conduction within the time duration of interest does not go beyond eight plies for the given CFRP material; and (d) as a result, the ratio of the temperature difference between points C and A over the temperature difference between B and A as a function of number of plies laid down approaches a constant (see FIG. 14).

To validate the thermal model, heater characterization test results were used to correlate with model predictions for the one-ply prepreg heating test. After further investigation, it was concluded that the finite element analysis results were consistent with theory—temperature rise should be proportional to heat flux input.

The modeled compaction point temperature data was developed into a method of predicting the percent power needed to the infrared heater as a function of number of plies in the substrate, feed rates, and target temperatures. The method that was implemented assumed a fixed ratio of the difference between the compaction point temperature and the aft IR temperature sensor temperature divided by the difference between the forward IR temperature sensor and aft IR temperature sensor. Using this fixed ratio, the compaction point temperature can then be inferred knowing the difference in temperature between the forward and aft IR temperature sensors.

The closed-loop feedback system described above is intended to control for extraneous variables. The substrate temperature is one such variable. Changes in the substrate temperature will be reflected in the IR temperature sensor readings and will then bring about changes in the heater power to achieve the desired compaction point temperature.

In summary, the system described above enables practice of a method for controlling a heater 20 during placement of tows of fiber-reinforced plastic material by a fiber placement machine. In accordance with one embodiment, the method comprises: (a) creating a thermal model 40 that correlates a temperature of a compaction point under a compaction roller 12 to first and second temperatures of a substrate 16 in first and second measurement spots respectively, wherein the first measurement spot is located forward of the compaction roller 12 and aft of the heater 22 and the second measurement spot is located aft of the compaction roller 12 when the compaction roller 12 is in contact with the substrate 16; (b) compacting tows of fiber-reinforced plastic material on the substrate 16 by rolling the compaction roller 12 on a surface of the substrate 16 with the tows therebetween; (c) heating the substrate 16 in an area upstream of the first measurement spot during compaction using an electrically powered heater 20; (d) acquiring a first temperature measurement from the first measurement spot; (e) acquiring a second temperature measurement from the second measurement spot; (f) using the thermal model 40 to infer an estimated compaction point temperature that is a function of at least one of the first and second temperature measurements; (g) calculating a difference between the estimated compaction point temperature and a target compaction point temperature; (h) issuing control signals that represent a command to supply an amount of electrical power to the heater 20, which amount of electrical power is calculated to reduce the difference between the estimated compaction point temperature and the target compaction point temperature; and (i) supplying the amount of electrical power to the heater, wherein steps (f) through (g) are performed by a computing system (e.g., control computer 4). This method may further comprise: acquiring a third temperature measurement from a third measurement spot on the substrate 16 located forward of the heater 20; configuring the thermal model 40 to infer an estimated heating point temperature of the portion of the substrate 16 under the heater 20 based at least in part on the difference between the first and third temperatures; determining whether the estimated heating point temperature exceeds a maximum allowable substrate temperature or not; and turning off the heater 22 if the estimated heating point temperature exceeds the maximum allowable substrate temperature.

While methods for closed-loop control of AFP heating have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computing systems. As used in the claims, the term "computing system" comprises one or more processing or computing devices. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The above examples are exemplary only, and thus are not intended to limit in any way the definition and/or meaning of the term "computing system".

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. An automated fiber placement machine comprising:
a head comprising a compaction roller;
a tool disposed to form a compaction zone between the tool and the compaction roller;
a heater mounted forward of the compaction roller and configured to convert electrical power into heat for heating a substrate on the tool;
a heater power controller configured to convert heater power control signals to an output voltage which is used to power the heater;
a first temperature sensor directed at a first measurement spot on the substrate located either forward of the compaction roller and aft of the heater or aft of the compaction roller, wherein the first temperature sensor, when operative, outputs first temperature data when the compaction roller is in contact with the substrate;
a non-transitory tangible computer-readable storage medium storing computer code representing a thermal model comprising thermal model data representing a correlation curve that relates compaction point temperature of the substrate to temperature sensor measurements, wherein the thermal model is configured to estimate an estimated compaction point temperature of the substrate under the compaction roller based at least in part on the thermal model data representing the correlation curve, the first temperature data output by the first temperature sensor and a speed at which the head is moving; and
a computing system configured to perform operations comprising:
using the thermal model to estimate the estimated compaction point temperature of the substrate under the compaction roller based at least on the first temperature data output by the first temperature sensor and the speed at which the head is moving;
calculating a current difference between the estimated compaction point temperature and a target compaction point temperature;
generating heater power control signals for changing the electrical power supplied to the heater in a manner that will reduce a subsequent difference between the estimated and target compaction point temperatures; and
outputting the heater power control signals to the heater power controller.

2. The automated fiber placement machine as recited in claim 1, further comprising a second temperature sensor directed at a second measurement spot on the substrate located either forward of the compaction roller and aft of the heater if the first measurement spot is located aft of the compaction roller or aft of the compaction roller if the first measurement spot is located forward of the compaction roller and aft of the heater, wherein the second temperature sensor, when operative, outputs second temperature data when the compaction roller is in contact with the substrate, wherein the thermal model is configured to estimate the estimated compaction point temperature of the substrate under the compaction roller based at least in part on the first and second temperature data.

3. The automated fiber placement machine as recited in claim 2, wherein the heater comprises an infrared heater, while the first and second temperature sensors comprise first and second infrared temperature sensors respectively.

4. The automated fiber placement machine as recited in claim 2, wherein the thermal model is configured to estimate the estimated compaction point temperature of the substrate under the compaction roller as a function of a difference between the first and second temperature data output by the first and second temperature sensors.

5. The automated fiber placement machine as recited in claim 2, further comprising a third temperature sensor directed at a third measurement spot located forward of the heater, wherein the third temperature sensor, when operative, outputs third temperature data when the compaction roller is in contact with the substrate, and wherein the thermal model is further configured to estimate an estimated temperature of the substrate under the heater based at least in part on a difference between the first and third temperature data output by the first and third temperature sensors.

6. The automated fiber placement machine as recited in claim 1, wherein the head further comprises shielding disposed and configured to block radiation reflected by the substrate from reaching the first temperature sensor.

7. The automated fiber placement machine as recited in claim 1, wherein the thermal model is configured to take into account a number of plies of the substrate.

8. The automated fiber placement machine as recited in claim 1, wherein the thermal model is configured to take into account heat loss due to roller contact.

9. The automated fiber placement machine as recited in claim 8, wherein the computing system further comprises a proportional-integral-derivative controller that receives a signal representing the difference calculated using the thermal model and outputs heater power control signals configured to cause the heater to operate in a manner that reduces the difference between the estimated compaction point temperature and the target compaction point temperature.

10. The automated fiber placement machine as recited in claim 1, further comprising:
   a signal conditioner operatively coupled to receive the heater power control signals from the computing system; and
   wherein the heater power controller is operatively coupled to the signal conditioner and configured to convert conditioned heater power control signals to an output voltage which is used to power the heater.

11. The automated fiber placement machine as recited in claim 1, wherein the computing system is further configured to execute an open-loop control algorithm when the head is laying material and the first temperature data is invalid and a closed-loop control algorithm when the head is laying material and the first temperature data is valid.

12. A method for controlling a heater during placement of tows of fiber-reinforced plastic material on a tool by a head of a fiber placement machine, comprising:
   a non-transitory tangible computer-readable storage medium storing computer code representing a thermal model comprising thermal model data representing a correlation curve that relates compaction point temperature of the substrate to temperature sensor measurements, wherein the thermal model is configured to estimate an estimated compaction point temperature of the substrate under the compaction roller based at least in part on the thermal model data representing the correlation curve, the first temperature data output by the first temperature sensor and a speed at which the head is moving; and
   (a) creating a thermal model comprising thermal model data representing a correlation curve that relates compaction point temperature of the substrate to temperature sensor measurements, wherein the thermal model is configured to estimate an estimated compaction point temperature of a substrate at a compaction point between a tool and a compaction roller based to at least in part on the thermal model data representing the correlation curve, a first temperature of a substrate at a first measurement spot and a speed at which the head is moving, wherein the first measurement spot is on the substrate located either forward of the compaction roller and aft of a heater or aft of the compaction roller when the compaction roller is in contact with the substrate;
   (b) compacting tows of fiber-reinforced plastic material on the substrate by rolling the compaction roller on a surface of the substrate with the tows therebetween;
   (c) heating the substrate in an area upstream of the first measurement spot during compaction using the heater;
   (d) acquiring a first temperature measurement from the first measurement spot;
   (e) using the thermal model to estimate a current estimated compaction point temperature that is a function of at least the first temperature measurement;
   (f) calculating a difference between the current estimated compaction point temperature and a target compaction point temperature;
   (g) issuing control signals that represent a command to supply an amount of electrical power to the heater, which amount of electrical power is calculated to reduce the difference between a subsequent estimated compaction point temperature and the target compaction point temperature; and
   (h) supplying the amount of electrical power to the heater, wherein at least steps (e) through (g) are performed by a computing system.

13. The method as recited in claim 12, further comprising acquiring a second temperature measurement from a second measurement spot on the substrate, wherein the thermal model also correlates the temperature of the compaction point to a second temperature of the substrate at the second measurement spot, the second measurement spot is located forward of the compaction roller and aft of the heater if the first measurement spot is aft of the compaction roller or aft of the compaction roller if the first measurement spot is forward of the compaction roller and aft of the heater when the compaction roller is in contact with the substrate, and step (e) comprises using the thermal model to estimate an estimated compaction point temperature that is a function of a difference of the first and second temperature measurements.

14. The method as recited in claim 12, wherein step (c) comprises radiating the substrate with infrared radiation.

15. The method as recited in claim 13, further comprising blocking heat reflected by the substrate from reaching a temperature sensor that is directed toward the one of the first and second measurement spots which is located forward of the compaction roller and aft of the heater.

16. The method as recited in claim 12, wherein the estimated compaction point temperature outputted by the thermal model is a function of a number of plies of the substrate.

17. The method as recited in claim 12, further comprising:
   acquiring a third temperature measurement from a third measurement spot on the substrate located forward of the heater;
   configuring the thermal model to estimate an estimated heating point temperature of a portion of the substrate under the heater based at least in part on the difference between the first and third temperature measurements;
   determining whether the estimated heating point temperature exceeds a maximum allowable substrate temperature or not; and
   turning off the heater if the estimated heating point temperature exceeds the maximum allowable substrate temperature.

18. The method as recited in claim 13, further comprising:
   determining whether the first and second temperature measurements are valid or not; and
   executing an open-loop control algorithm when the first and second temperature measurements are not valid and a closed-loop control algorithm when the first and second temperature measurements are valid.

19. A method for controlling a heater during placement of tows of fiber-reinforced plastic material by a fiber placement machine, comprising:

(a) compacting tows of fiber-reinforced plastic material on a substrate supported by a tool by rolling a compaction roller on a surface of the substrate with the tows therebetween at a speed;

(b) heating the substrate in an area upstream of the compaction roller using a heater;

(c) acquiring a first temperature measurement from a first measurement spot on a portion of the substrate located aft of the heater and forward of the compaction roller;

(d) acquiring a second temperature measurement from a second measurement spot on a portion of the substrate located aft of the compaction roller;

(e) determining whether the first and second temperature measurements are valid or not;

(f) executing an open-loop control algorithm when the first and second temperature measurements are not valid;

(g) executing a closed-loop control algorithm when the first and second temperature measurements are valid, wherein step (g) comprises:

estimating a current estimated compaction point temperature that is a function of the speed at which the compaction roller is moving and at least one of the first and second temperature measurements;

calculating a difference between the current estimated compaction point temperature and a target compaction point temperature; and issuing control signals that represent a command to supply an amount of electrical power to the heater, which amount of electrical power is calculated to reduce the difference between a subsequent estimated compaction point temperature and the target compaction point temperature; and (h) supplying the amount of electrical power to the heater, wherein at least steps (e) through (g) are performed by a computing system.

20. The method as recited in claim 19, wherein step (c) comprises radiating the substrate with infrared radiation.

21. The method as recited in claim 19, further comprising calculating the amount of electrical power to be supplied to the heater as a function of a difference between the first and second temperature measurements from the first and second measurement spots, respectively.

* * * * *